(12) United States Patent
Chia et al.

(10) Patent No.: US 6,662,027 B2
(45) Date of Patent: Dec. 9, 2003

(54) METHOD OF ARBITRATING SPEAKERPHONE OPERATION IN A PORTABLE COMMUNICATION DEVICE FOR ELIMINATING FALSE ARBITRATION DUE TO ECHO

(75) Inventors: Samuel Han Siong Chia, Glugor (MY); Ali Behboodian, Plantation, FL (US); Pratik Desai, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 426 days.

(21) Appl. No.: 09/811,252

(22) Filed: Mar. 16, 2001

(65) Prior Publication Data

US 2002/0132647 A1 Sep. 19, 2002

(51) Int. Cl.$^7$ ................................................ H04M 1/00
(52) U.S. Cl. .................... 455/570; 455/79; 379/406.01; 379/406.04
(58) Field of Search ................................ 455/569, 570, 455/573; 370/406.01, 406.02, 406.06, 406.15; 704/233; 381/83, 66, 93, 85, 44.1, 95, 96, 334; 379/406.01, 406.04

(56) References Cited

U.S. PATENT DOCUMENTS

| | | | | |
|---|---|---|---|---|
| 3,925,618 A | * | 12/1975 | Kato et al. ............. | 379/388.05 |
| 4,378,603 A | * | 3/1983 | Eastmond .................... | 455/79 |
| 4,887,288 A | * | 12/1989 | Erving .................... | 379/22.02 |
| 4,979,163 A | * | 12/1990 | Erving et al. ................ | 370/288 |
| 5,696,819 A | * | 12/1997 | Suizu et al. ........... | 379/406.08 |
| 5,867,574 A | * | 2/1999 | Eryilmaz ............... | 379/388.04 |
| 5,937,060 A | * | 8/1999 | Oh ......................... | 379/406.14 |
| 6,091,937 A | * | 7/2000 | Uhlemann ............... | 455/67.11 |
| 6,157,906 A | * | 12/2000 | Nicholls et al. ........... | 704/214 |
| 6,223,154 B1 | * | 12/2000 | Nicholls et al. ........... | 704/233 |

OTHER PUBLICATIONS

"Echo in Telephony Systems" Ericsson Echo Cancellers at http://www.ericsson.com/echo/edu/we.shtml pp. 1–4.
"Digital Wireless Applications of E1 Echo Cancellers" Product Application Note, Tellabs, www.tellabs.com.

* cited by examiner

Primary Examiner—Charles Appiah
(74) Attorney, Agent, or Firm—Scott M. Garrett

(57) ABSTRACT

A speakerphone arbitration method is used to eliminate the effects of echo in imperfect telephone circuits. The method assumes that speech energy received at the speaker phone is an echo, unless the speech energy has characteristics that indicate it is not echo, such as the duration of the speech energy, and the time at which the speech energy is received relative to the time when the user of the speakerphone finishes speaking, or pauses while speaking. The method also may allow arbitration if the speech energy is more energetic than a typical echo, regardless of the duration or time when it is received.

12 Claims, 3 Drawing Sheets

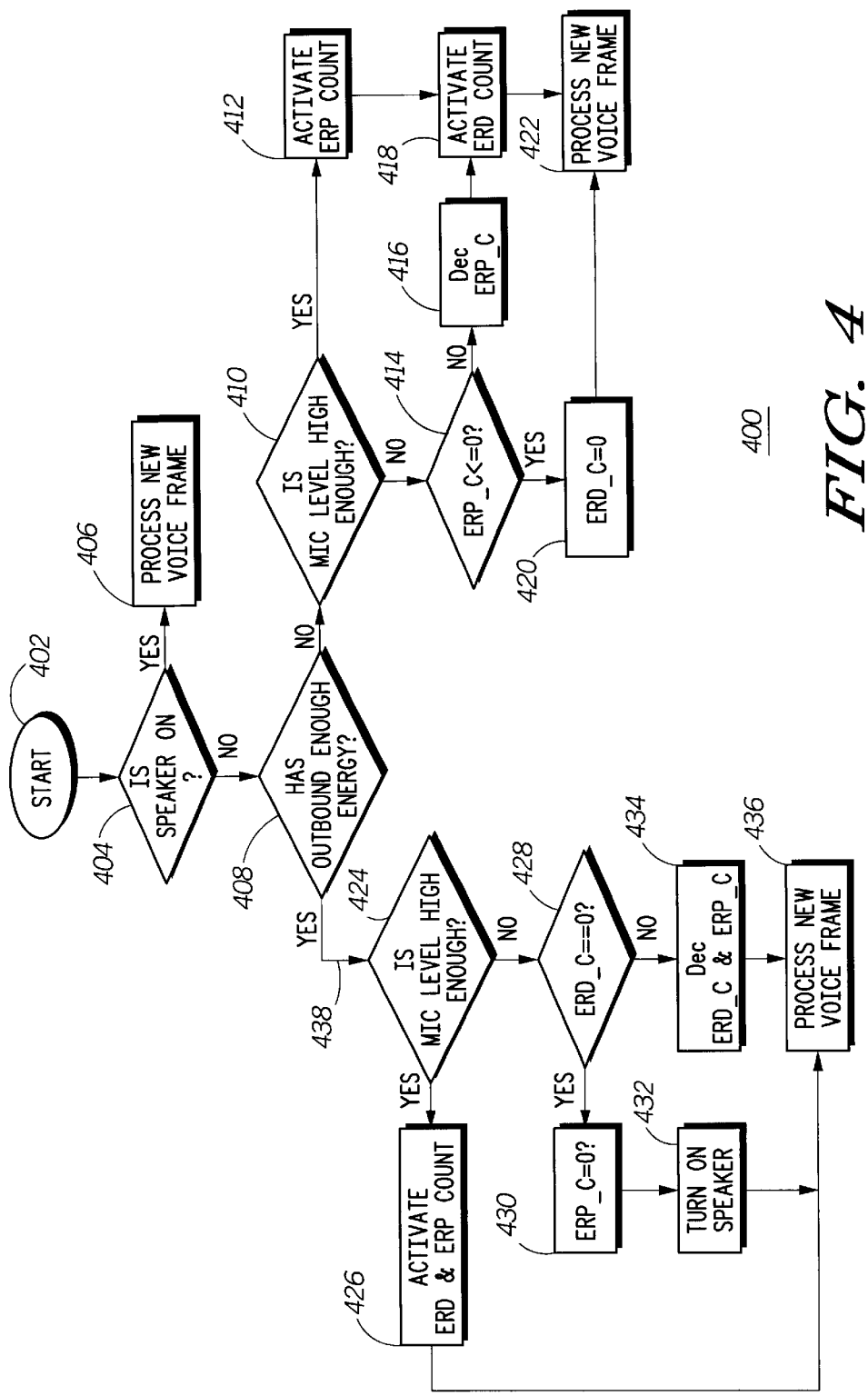

METHOD OF ARBITRATING SPEAKERPHONE OPERATION IN A PORTABLE COMMUNICATION DEVICE FOR ELIMINATING FALSE ARBITRATION DUE TO ECHO

TECHNICAL FIELD

This invention relates in general to speaker phone operation in portable communication devices, and more particularly to the arbitration between the inbound and outbound audio paths in leaky network environments where inbound echo is present.

BACKGROUND OF THE INVENTION

Portable communication devices such as cellular telephones have achieved widespread market distribution, and are commonly used by many people, particularly in metropolitan areas. Cellular phone technology is approaching maturity, and more frequently cellular phone manufactures are looking for features to add to cellular phones to increase their marketability and usefulness. One such feature is the speakerphone mode of operation.

Implementing a speakerphone in a cellular phone has long been a difficult challenge. There are several reasons for this. A significant reason is the environment where cellular phones are used varies greatly, unlike regular land-line speakerphone/phones which are more typically used in office or home environments. The places where cellular phones are used often have high amounts of background noise, and particularly fricative like sounds, such as the sound or air rushing over an automobile while the automobile is in motion. A variety of such problems have been addressed in U.S. Pat. Nos. 6,122,531, 6,138,040, and 6,157,902, all of which are assigned to the present assignee.

These three patents describe various problems involved in operating a simplex speakerphone, and the arbitration between the two audio paths in the presence of noisy backgrounds. However, it has been discovered that other factors affect the arbitration that are not due to external acoustic noise, but idiosyncrasies of the telephone communications systems. Specifically, it has been found that the voice energy of the user of the portable communication device being operated in a speakerphone mode can come back as echo from the infrastructure switching equipment. This echo, if received during a pause in the users speech, can cause the portable communication device to decide that incoming speech has been received and shut off the microphone path and activate the speaker path. When the user begins speaking again, if the echo is still present, the portable communication device will ignore the microphone path until after cessation of the echo. This causes an omission in the user's speech to be heard by the far end party. It also causes the user to hear pops and crackling sounds while speaking. Therefore there is a need for a method of arbitrating speakerphone operation in a portable communication device that eliminates falsing due to echoes.

BRIEF DESCRIPTION OF THE DRAWINGS

FIG. 4 shows a flow chart diagram of a method of arbitrating speakerphone operation in a portable communication device to eliminate false arbitration due to echo.

DETAILED DESCRIPTION OF A PREFERRED EMBODIMENT

Figure 1:
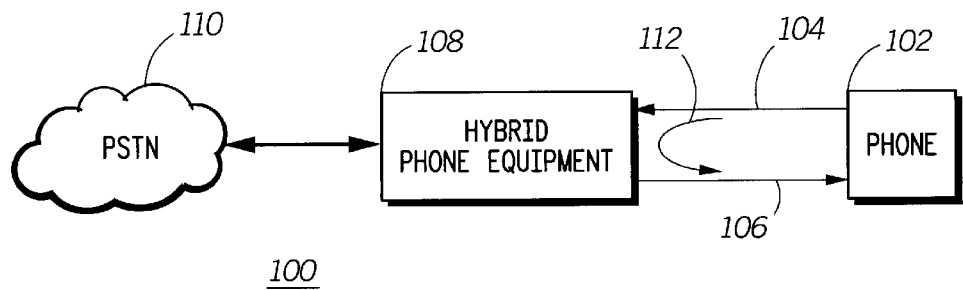
FIG. 1 shows a block diagram of a connection between a portable communication device and a public switched telephone network where echo is introduced.

While the specification concludes with claims defining the features of the invention that are regarded as novel, it is believed that the invention will be better understood from a consideration of the following description in conjunction with the drawing figures, in which like reference numerals are carried forward. A brief description of the problem is also thought to be useful.

Referring to FIG. 1, there is shown a block diagram 100 of a connection between a portable communication device and a public switched telephone network where echo is introduced. The portable communication device or cellular phone 102 is presently engaged in a call to another party, and operating in a speakerphone mode. The phone comprises a speaker and audio amplifier capable of amplifying a received voice signal to a level where it can be heard at a distance by the user of the phone. As is well known the art, the phone comprises a transceiver including a receiver and a transmitter. The receiver, amplifier, and speaker form a speaker path. A microphone, and the transmitter form a microphone path. Arbitration is the process of muting the microphone path and activating the speaker path while the remote party is speaking, and muting the speaker path and activating the microphone path while the phone user is speaking. This type of arbitration results in a simplex speakerphone mode. Line 104 represents the microphone path signal, which is transmitted over an air interface to fixed infrastructure equipment, as is well known. Line 106 represents the received signal that is received by the phone, and may be the voice signal of the remote party to whom the user of the phone is speaking, which converts the signal. Eventually the transmitted signal encounters a hybrid 108, which can produce echo, due to mismatch in the hybrid, as the phone signals are passed in the public switched telephone network 110, or is used after the PSTN closer to the remote party's equipment. Typically a portable communication device's signal passes through a mobile switching center, as is well known in the art, which comprises an echo canceller. However, many times echo cancellers are not able to completely cancel the echo produced by the hybrid(s), and this is more common when calling a party that is using an analog plain old telephone system (POTS) line. Often the echo cancellation is imperfect and results in an echo 112 of the transmitted signal being sent back on the received signal. It is known to those skilled in the art that while the phone itself is arbitrated between the microphone path and the speaker path, the phone continues to transceive in a duplex mode, meaning that it continues to receive and transmit at the same time, or substantially the same time in timeslot pairs, as in time divisioned air interfaces.

Figure 2:
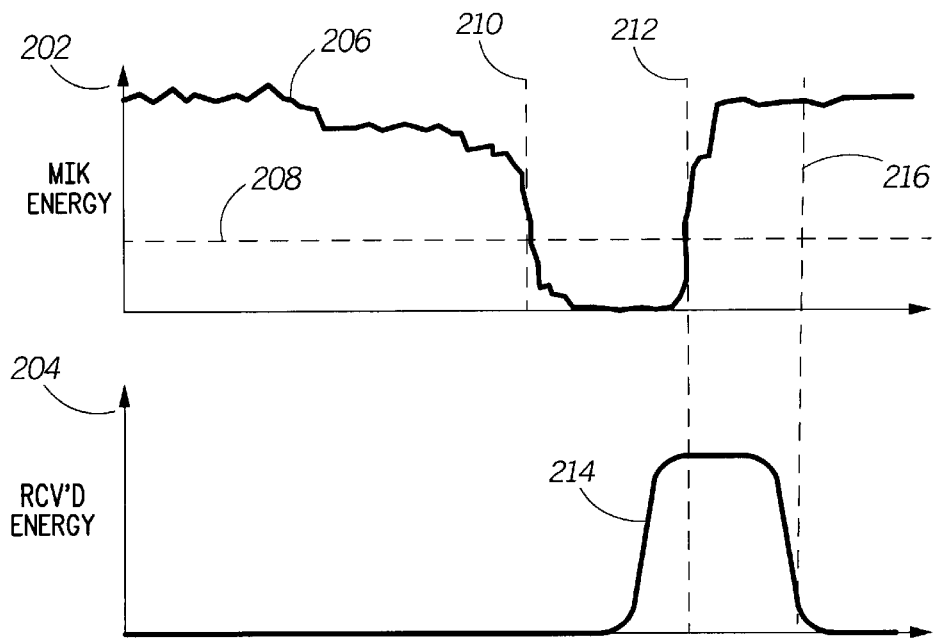
FIG. 2 shows a graph chart illustrating the occurrence of an echo that interferes with conventional arbitration of a simplex speakerphone.

Referring now to FIG. 2, there is shown a graph chart 200 illustrating the occurrence of an echo that interferes with conventional arbitration of a simplex speakerphone. The top graph 202 is a graph of energy in the microphone path versus time. The bottom graph 204 is a graph of energy in the speaker path versus time. The instantaneous microphone path energy value is shown by curve 206. This energy level indicates the strength of the signal in the microphone path, i.e. the signal produced by the user while speaking. The energy is determined, preferably, by digitizing the analog signal produced by the microphone, segmenting the digitized signal into frames, and determining the energy in each frame. In phones using digital modulation, it is common to perform voice encoding, such as vector sum excited linear predictive (VSELP) encoding. Each VSELP frame contains an energy measurement, which may be used in the instant invention. As long as the microphone path energy value is above a microphone energy threshold value 208, the phone declares speech is present in the microphone path. At some time 210 the person speaking into the phone may have a pause or brief interruption in their speech. An echo 214 may then be received before the user of the phone resumes speaking at time 212. At the time the echo is first received, the microphone path energy level is still low because the speaker is still pausing. Under normal arbitration rules, this situation would cause the phone to mute the microphone path and activate the speaker path until the echo energy level drops off at time 216, where the microphone path is reactivated and the speaker path is muted. However, since what was received was echo, and not speech from the remote party, the user's speech between times 212 and 216 is not heard by the remote party since the microphone path is muted, under conventional arbitration.

Figure 3:
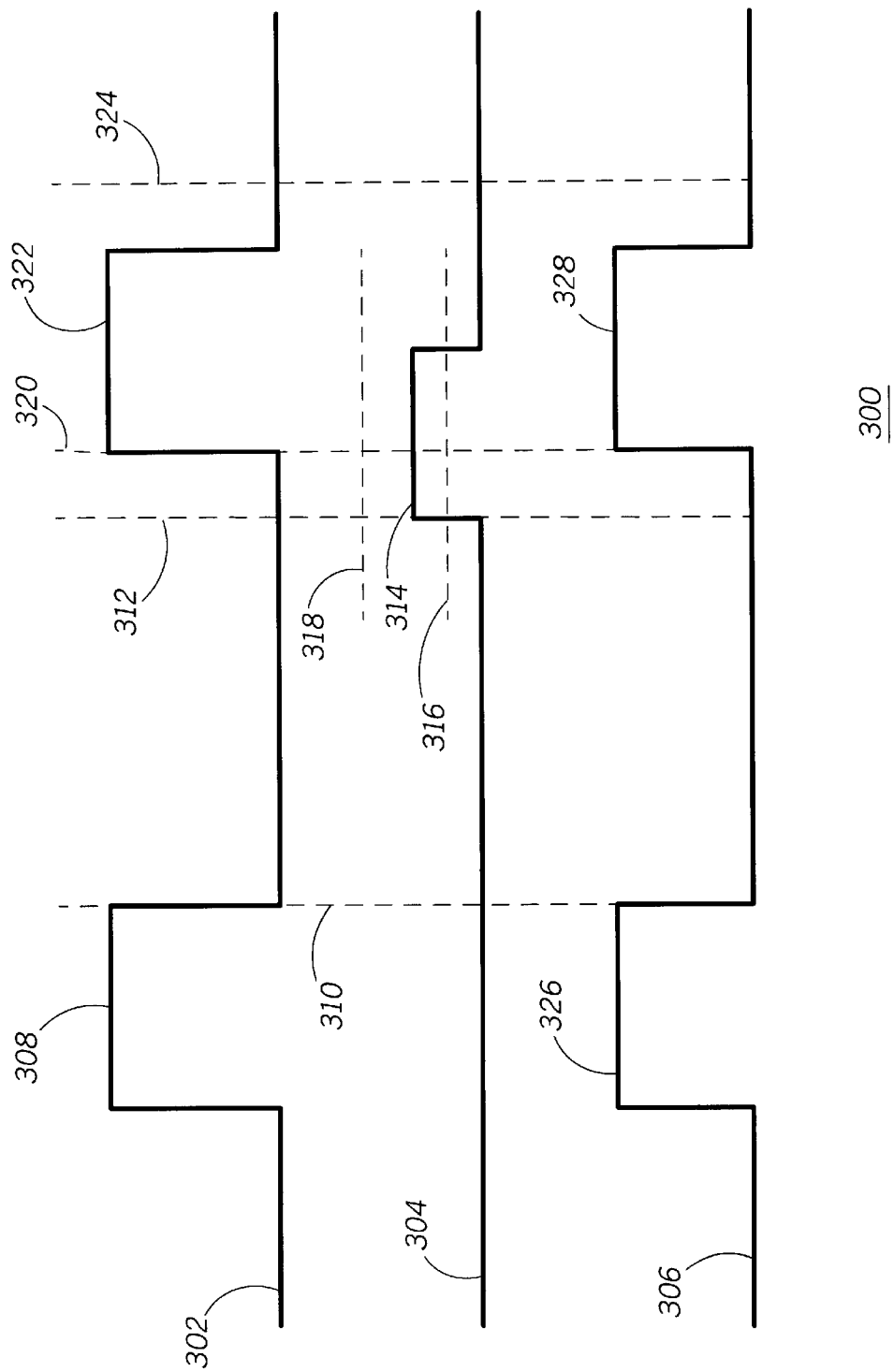
FIG. 3 shows a graph chart illustrating operation of a method of arbitrating speakerphone operation in a portable communication device to eliminate false arbitration due to echo.

Referring now to FIG. 3, there is shown a graph chart 300 illustrating operation of a method of arbitrating speakerphone operation in a portable communication device to eliminate false arbitration due to echo. The top graph 302 represents the detection of speech energy in the microphone path versus time, the middle graph 304 represents the detection of speech on the speaker path versus time, and the bottom graph 306 represents the time periods in which the remote party hears speech from the user of the portable communication device. These graphs show the relative time periods when the energy is sufficiently high to declare speech present in the respective paths for the present example.

According to the present example, speech is initially not detected anywhere. In the preferred embodiment, while the portable communication device is in a speakerphone mode, the microphone path is active and the speaker path is muted when speech is not detected in either path. In other words, when speech is not detected in either path, the default state is to activate the microphone path and mute the speaker path. According the present example, the user of the portable communication device speaks during time period 308. Therefore the top graph shows that speech is detected in the microphone path during that time. This means that during time period 308, the microphone path energy value exceeds the microphone energy threshold value. The microphone energy threshold value may be fixed at a preselected level, or, through processing, it may be dynamic to ensure there is speech present. The time period 308 can, therefore, represent a word being spoken by the user of the portable communication device. At time 310 the microphone path energy value falls below the microphone energy threshold value, and thus the portable communication device no longer declares speech present in the microphone path. At a subsequent time 312, in the speaker path 304, while the microphone path energy value remains below the microphone energy threshold value, the speaker path energy value is detected as being greater than a speaker energy threshold on the speaker path during the time period of pulse 314. The speaker energy threshold is represented by line 316. However, because of the timing, and the relatively low energy level, despite being sufficiently energetic to consider the speaker energy to be speech, it is assumed this pulse is the result of echo. In an alternative embodiment, if the speaker path energy value rises above a maximum echo energy threshold value 318, then it is assumed that the energy in the speaker path is the result of speech, and not echo. After the speaker path energy rises at time 312, the microphone path energy rises again at time 320 above the microphone energy threshold value during the pulse 322.

Normally the initial portion of the speech occurring during the pulse 322 would be cut off by the echo pulse 314. However, according to the invention, once the microphone energy falls below the microphone path energy threshold at 310, the portable communication device scrutinizes the speaker path for an echo suppression time period starting at time 310. The echo suppression time period can vary, but is generally in the range of 50 to 500 milliseconds. The echo suppression time period can be measured by an echo suppression time period timer operated by, for example, a software timer in the portable communication device. Here the echo suppression time period begins at time 310 and runs until time 324. If, before the expiration of the echo suppression time period, and while the speaker path energy value remains above the speaker energy threshold longer than the duration of an echo return duration time period, the portable communication device mutes the microphone path and activates the speaker path. The echo return duration time period is shorter than the echo suppression time period. The speaker energy pulse 314 is shorter than the echo return duration time period, and therefore the portable communication device ignores the speech energy in the speaker path. As a result, the remote party hears speech from the user of the portable communication device during pulses 326 and 328, and does not miss the initial portion of the portable communication device user's speech pulse 322, as would happen under conventional arbitration due to falsing caused by the echo pulse 314. The flow chart diagram of FIG. 4 illustrates the decision making performed by the portable communication device to accomplish the arbitration according to the invention.

Referring now to FIG. 4, there is shown a flow chart diagram 400 of a method of arbitrating speakerphone operation in a portable communication device to eliminate false arbitration due to echo. At the start (402) of the method, the portable communication device is powered on, in a speakerphone operating mode, and presently engaged in a telephone call. The default condition regarding the microphone and speaker paths is to have the microphone path active and the speaker path muted when there is no speech energy in either path, and by speech energy it is meant that there is sufficient signal energy to indicate the presence of speech information in the respective pathway. Speech can also be detected according to the method taught in U.S. Pat. No. 6,157,906, the disclosure of which is hereby incorporated by reference. In the preferred embodiment, the portable communication device checks to see if speech is declared in the speaker path (404) If speech is in the speaker path, meaning the speaker path is active and the microphone path is muted, it means that the portable communication device is receiving speech from the remote party. Therefore the portable communication device processes the voice information (406), and plays the audio information received from the remote party over a speaker of the portable communication device.

If there the speaker path is not active, the next decision made by the portable communication device is if there is speech energy in the speaker path (408). If there is no speaker energy in the speaker path, the portable communication device must decide if there is speech energy in the microphone path, i.e. does the microphone path energy value exceed the microphone energy threshold value (410). If it does, then the portable communication device initializes a pair of timers for timing the echo suppression time period (412) and the echo return duration time period (418). Then the next voice frame is processed (422) and the method starts over at 402. In FIG. 4 the echo suppression time period timer is represented by the symbol ERP and the echo suppression time period timer count is shown as ERP_C. The echo duration time period timer is ERD and the echo duration time period timer count is ERD_C.

Going back to the decision point at 410, if the microphone path energy does not indicate speech being present on the microphone path, the portable communication device checks the echo suppression time period timer count (414), ERP_C. If ERP_C indicates the echo suppression time period has not expired, then the ERP_C counter is decremented (416), and the echo duration time period timer is initialized (418), then the next voice frame is processed (422) and the process starts over. Going back to the decision point at 414, if the ERP_C count is zero, or otherwise indicates the echo suppression time period has passed, the portable communication device sets the echo duration timer count ERD_C to indicate the echo duration time period has also expired (420), and the next voice frame is processed (422), and the method repeats starting at 402.

Going back to the decision point at 408, the speaker path is not active, but if there is speech energy on the speaker path, the portable communication device checks to see if there is speech energy on the microphone path (424). If there is, then the ERP_C and ERD_C counts are set to their initial values (426). This describes the scenario where the speaker energy may be the result of echo. After the timers are initialized the next voice frame is processed (436) and the method begins again.

If the microphone path does not indicate the presence of speech energy while the speaker path contains energy, then this indicates that the microphone energy has fallen below the microphone energy threshold value, so the portable communication device checks the echo duration time period timer ERD_C (428). If ERD_C indicates that the echo duration time period has expires, then the echo suppression time period timer is also set to zero, or to otherwise indicate the echo suppression time period has expired (430), and the portable communication device commences activating the speaker path and muting the microphone path (432), and processing the next voice frame (436). If the echo duration time period at 428 has not expired, then the speaker energy is still considered to be echo, and the echo suppression timer period timer and the echo duration time period timer are both decremented (434), and the next voice frame is processed.

In an alternative embodiment, two more decisions can be made which enhance speakerphone arbitration. First, at the point when speech energy is detected in the speaker path, but the speaker path is not yet activated, at point 438, the portable communication device checks to see if the echo duration time period counter is presently set to its maximum value. If not, then the portable communication device skips the decision checking the microphone energy (424), and proceeds to another additional decision at point 440. Skipping the decision at 424 is done to allow the portable communication device to arbitrate at the expiration of the echo duration time period, regardless of the state of the microphone path, which allows the remote party to more easily cut in. At point 440 the portable communication device checks the energy level of the speaker path to see if it exceeds a maximum echo energy threshold value ERT, which indicates that the signal being received in the speaker path is more energetic than a typical echo, and so is likely to be speech information from the remote party, and not an echo. When that is the case, the echo duration time period timer count ERD_C is set to zero, and the portable communication device proceeds to the decision at 428. As can be seen from following the path then, with ERD_C set to zero, the portable communication device will activate the speaker path and mute the microphone path at 432. If the speaker path energy at 440 is not sufficiently energetic to clearly indicate the presence of speech in the speaker path, the portable communication device does nothing at 440 and continues to 428.

It is also contemplated that, instead of simply observing the energy in the microphone path and speaker path to detect the presence of speech, other parameters available to the portable communication device may be used in conjunction with the energy, such as those methods taught in U.S. Pat. No. 6,157,906. In which case, rather than detecting the microphone path energy value exceeding a microphone energy threshold value on the microphone path, for example, it can be simply said that the portable communication device detects speech in the microphone path. Likewise, rather than detecting a speaker path energy value being greater than a speaker energy threshold on the speaker path, it can be more simply stated that the portable communication device simply detects speech in the speaker path, irregardless of the method used to detect speech.

Thus the invention solves the problem of false arbitration triggered by echo return for a speakerphone. This enhances the speakerphone arbitration in portable communication devices operated in a speakerphone mode. The invention solves the problem by assuming an echo will be received within an echo suppression time period, and any energy in the speaker path is ignored while the microphone path energy is low unless; the echo suppression time period has expired or the echo duration time period has expired and the speaker path energy level continues to indicate a signal is being received. Furthermore, if the speaker path energy is sufficiently high to indicate clearly that the received signal is likely not an echo, but speech information from the remote party, the portable communication device may switch arbitration and activate the speaker path and mute the microphone path.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for arbitrating speakerphone operation in a portable communication device for eliminating false arbitration due to echo, comprising:

activating a microphone path and muting a speaker path of the portable communication device;

detecting a microphone path energy value exceeding a microphone energy threshold value on the microphone path;

detecting the microphone path energy value falling below the microphone energy threshold value after the microphone path energy value exceeded the microphone energy threshold value;

detecting a speaker path energy value being greater than a speaker energy threshold on the speaker path while the microphone path energy value is lower than the microphone energy threshold, and before an expiration of an echo suppression time period, the echo suppression time period beginning when the microphone path energy value falls below the microphone energy threshold; and before the expiration of the echo suppression time period:
if the speaker path energy value remains above the speaker energy threshold longer than a duration of an echo return duration time period, muting the microphone path and activating the speaker path, the echo return duration time period being shorter than the echo suppression time period.

2. A method for arbitrating speakerphone operation in a portable communication device as defined in claim 1, wherein, before the expiration of the echo suppression time period, while the microphone path energy value remains below the microphone energy threshold value, and before the echo return duration time period passes, if the speaker path energy value rises above a maximum echo energy threshold value, muting the microphone path and activating the speaker path.

3. A method for arbitrating speakerphone operation in a portable communication device as defined in claim 1, further comprising selecting the echo suppression time period to be in the range of 50 to 500 milliseconds.

4. A method for arbitrating speakerphone operation in a portable communication device as defined in claim 1, further comprising:
if the echo suppression period expires, and if the microphone path energy value remains below the microphone energy threshold value, muting the microphone path and activating the speaker path if the speaker path energy value rises above the speaker energy threshold; and activating the microphone path and muting the speaker path when the speaker path energy value falls below the speaker energy threshold.

5. A method for arbitrating speakerphone operation in a portable communication device for eliminating false arbitration due to echo, comprising:
activating a microphone path and muting a speaker path of the portable communication device;
detecting a microphone path energy value exceeding a microphone energy threshold value on the microphone path;
running an echo suppression time period timer in the portable communication device upon detecting the microphone path energy value falling below the microphone energy threshold value, the echo suppression time period timer for timing an echo suppression time period;
detecting a speaker path energy value being greater than a speaker energy threshold on the speaker path while the microphone path energy value is lower than the microphone energy threshold, and before an expiration of an echo suppression time period, the echo suppression time period beginning when the microphone path energy value falls below the microphone energy threshold; and
before the expiration of the echo suppression time period timer:
if the speaker path energy value remains above the speaker energy threshold longer than a duration of an echo return duration time period, muting the microphone path and activating the speaker path, the echo return duration time period being shorter than the echo suppression time period.

6. A method for arbitrating speakerphone operation in a portable communication device as defined in claim 5, wherein, before the expiration of the echo suppression time period, while the microphone path energy value remains below the microphone energy threshold value, and before the echo return duration time period passes, if the speaker path energy value rises above a maximum echo energy threshold value, muting the microphone path and activating the speaker path.

7. A method for arbitrating speakerphone operation in a portable communication device as defined in claim 5, further comprising selecting the echo suppression time period to be in the range of 50 to 500 milliseconds.

8. A method for arbitrating speakerphone operation in a portable communication device as defined in claim 5, further comprising:
if the echo suppression period expires, and if the microphone path energy value remains below the microphone energy threshold value, muting the microphone path and activating the speaker path if the speaker path energy value rises above the speaker energy threshold; and activating the microphone path and muting the speaker path when the speaker path energy value falls below the speaker energy threshold.

9. A method for arbitrating speakerphone operation in a portable communication device for eliminating false arbitration due to echo, comprising:
activating a microphone path and muting a speaker path of the portable communication device;
detecting speech on the microphone path;
detecting an absence of speech on the microphone path after previously detecting speech on the microphone path;
detecting speech on the speaker path after detecting the absence of speech on the microphone path, and before an expiration of an echo suppression time period, the echo suppression time period beginning when the detecting the absence of speech first occurs; and
before the expiration of the echo suppression time period:
if the speech is detected on the speaker path longer than a duration of an echo return duration time period, muting the microphone path and activating the speaker path, the echo return duration time period being shorter than the echo suppression time period.

10. A method for arbitrating speakerphone operation in a portable communication device as defined in claim 9, wherein, before the expiration of the echo suppression time period, while speech is not detected on the microphone path, and before the echo return duration time period passes, if a speaker path energy value rises above a maximum echo energy threshold value, muting the microphone path and activating the speaker path.

11. A method for arbitrating speakerphone operation in a portable communication device as defined in claim 9, further comprising selecting the echo suppression time period to be in the range of 50 to 500 milliseconds.

12. A method for arbitrating speakerphone operation in a portable communication device as defined in claim 9, further comprising:
if the echo suppression period expires while detecting the absence of speech in the microphone path, muting the microphone path and activating the speaker path upon detecting speech in the speaker path; and
activating the microphone path and muting the speaker path when the speaker path energy value falls below the speaker energy threshold.

* * * * *